United States Patent [19]

Squier

[11] 3,936,554

[45] Feb. 3, 1976

[54] THREE DIMENSIONAL DECORATIVE MATERIAL AND PROCESS FOR PRODUCING SAME

[75] Inventor: William H. Squier, Taylors, S.C.

[73] Assignee: M. Lowenstein & Sons, Inc., New York, N.Y.

[22] Filed: Apr. 19, 1974

[21] Appl. No.: 462,210

Related U.S. Application Data

[62] Division of Ser. No. 272,340, July 17, 1972.

[52] U.S. Cl. .................... 428/88; 428/90; 428/141; 428/311; 428/315; 156/72

[51] Int. Cl.² .............................................. B32B 3/30

[58] Field of Search ............... 161/64, 63, 119, 146; 156/72; 428/88, 90, 141, 311, 315

[56] References Cited

UNITED STATES PATENTS

| | | | |
|---|---|---|---|
| 3,496,054 | 2/1970 | Baigas, Jr. | 161/64 |
| 3,518,154 | 6/1970 | Broadhurst | 161/64 |
| 3,671,373 | 6/1972 | Grewe | 161/64 |
| 3,674,611 | 7/1972 | Petry et al. | 161/64 |
| 3,758,992 | 9/1973 | Olson | 161/64 |
| 3,819,464 | 6/1974 | Ungerer | 161/64 |
| 3,852,146 | 12/1974 | Squier et al. | 161/64 |

*Primary Examiner*—William J. Van Balen
*Attorney, Agent, or Firm*—Wellington M. Manning, Jr.

[57] ABSTRACT

A three dimensional, decorative material is disclosed and claimed herein, having good dimensional definition and capable of virtually unlimited design. A process for producing the three dimensional composite is also disclosed and claimed herein. The process originates with the manufacture of a master mold which can be produced with virtually any design, and preferably is made into a continuous belt. An elastomeric foam composition is then cast into the cavities of the master mold and fused in situ, whereby a three dimensional material is produced. Thereafter, a suitable adhesive is applied to the design side of the material and flock fibers or some other decorative substances are deposited thereon. After curing of the adhesive, any excess fibers are removed, and the material may be cut into suitable lengths, provided with a contact adhesive on the reverse side or the like.

6 Claims, 6 Drawing Figures

THREE DIMENSIONAL DECORATIVE MATERIAL AND PROCESS FOR PRODUCING SAME

CROSS-REFERENCE TO RELATED APPLICATION

This application is a division of co-pending application Ser. No. 272,340, filed July 17, 1972 and entitled THREE DIMENSIONAL DECORATIVE MATERIAL AND PROCESS FOR PRODUCING SAME.

BACKGROUND OF THE INVENTION

Numerous products have heretofore been produced where both woven and nonwoven fabrics were provided with a layer of foam laminated thereto, after which the composite was provided with a suitable backing so as to provide decorative textile materials. In such situations, the fabric which is a costly part of the laminate is completely enclosed by the foam, backing and the like and thus provides nothing more than strength for the composite. Further approaches include manufacturing techniques where decorative materials have been produced by expanding a foam on a temporary or permanent backing other than a textile material, applying an adhesive to the foam, flocking the foam and then embossing to provide a desired pattern or design in the material. Embossing has been accomplished by engraved roll techniques. Other prior techniques include foaming, and embossing followed by flocking; and/or the like where the product is physically or chemically deformed to assume the desired configuration. Printing an adhesive design onto a substrate, and flocking the adhesive area, followed by embossing has also been practiced. Products manufactured according to the above techniques have been utilized for floor coverings, wall coverings, draperies, and for other aesthetic purposes.

Numerous problems have been noted with the products and processes of the prior art. For example, products produced using a woven, nonwoven, knitted or other textile substrate are extremely expensive due to the high cost of the substrate, the high cost of necessary production equipment and low production speeds. Furthermore, definite limitations are found in the possible designs that may be incorporated into such a laminate. Embossed foam products are likewise fraught with disadvantageous properties. For example, utilization of a pressure plate, an engraved roll or the like for embossing a foamed article reduces definition of the design produced due to partial recovery of the foam. Moreover, the dimensional depth of the design is limited to the depth of engraving in the embossing roll and the design per se, is limited to the particular type design that may be provided by engraving the roll.

Chemical and other mechanical embossing techniques have also been utilized. In all such attempts, there has been a definite lack of fine definition in the designs. In all such prior attempts, the products have experienced variation in foam density throughout the structure. Foam density variation creates unnecessary cost to the system since excess foam is being utilized; different aesthetic appearances in high and low density areas are apparent; and in general the problems heretofore mentioned concerning the prior art are present.

The present invention provides a greatly improved process for the production of a product that is excellent from an aesthetic quality, and also possesses good resilience, abrasion resistance, acoustical, and insulative properties to mention a few. Moreover, there is virtually no limit to the design that may be incorporated into the three dimensional decorative material according to the teachings of the present invention. The operational process of the present invention avoids the problems of the prior art as does the product produced thereby. As such, the process and product of the present invention represent a definite improvement over those previously known and utilized by the prior art.

The prior art is devoid of any teaching or suggestion of the subject invention. Exemplary of the prior art are U.S. Pats. No. Re.23,741 to Summers; U.S. Pat. No. Re.26,385 to Gilchrist; U.S. Pat. No. 2,106,132 to Feinbloom; U.S. Pat. No. 2,691,611 to Saks; U.S. Pat. No. 2,714,559 to Sheffield et al.; U.S. Pat. No. 2,784,630 to Koprow et al.; U.S. Pat. No. 2,963,381 to Leimbacher; U.S. Pat. No. 3,194,702 to Geller et al.; U.S. Pat. No. 3,196,030 to Petry; U.S. Pat. No. 3,215,584 to McConnell et al.; U.S. Pat. No. 3,219,507 to Penman; U.S. Pat. No. 3,224,984 to Palmer; U.S. Pat. No. 3,322,606 to Koller; U.S. Pat. No. 3,365,353 to Witman; U.S. Pat. No. 3,408,248 to Maass; U.S. Pat. No. 3,436,245 to Grundman; U.S. Pat. No. 3,496,054 to Baigas, Jr.; U.S. Pat. No. 3,518,154 to Broadhurst; U.S. Pat. No. 3,528,874 to Spencer; U.S. Pat. No. 3,540,974 to Broadhurst; U.S. Pat. No. 3,575,778 to Wilcox; and U.S. Pat. No. 3,591,401 to Snyder et al.

SUMMARY OF THE INVENTION

It is an object of the present invention to provide a novel process for producing a three dimensional decorative material.

Another object of the present invention is to provide a novel process for the production of a three dimensional flocked article.

Still further, another object of the present invention is to provide a novel three dimensional decorative material.

Another object of the present invention is to provide a novel process for decorating a three dimensional compressible object.

Generally speaking, the present invention relates to a process for producing a three dimensional decorative material wherein a master mold is provided; an elastomeric foam is cast into the mold and fused therein; the foamed there dimensional material is stripped from the mold, an adhesive is applied to a surface of the article to be decorated; and the adhesive coated surface is flocked or otherwise treated after which the adhesive is cured.

More specifically, a master mold is provided having a predetermined design therein, the mold having good mold release characteristics. Preferably, a silicone rubber mold is provided which possesses natural mold release characteristics. Most preferably the mold is provided as a continuous belt to facilitate continuous or semi-continuous production.

Foamable compositions that may be utilized are preferably of vinyl, rubber or urethane composition though other elastomeric compositions are also suitable. Preferably, the foam is applied as a froth which is poured into the mold cavities and evened across the upper surface thereof. After casting the frothed foam composition into the mold, the foam is fused therein to produce a precise replica of the mold design. The molded material is then stripped from the mold and transported to decorative processing, exemplified by the application of adhesive and flocking. Optionally, a side of the molded article to be decorated may be further heated prior to application of adhesive thereto.

Adhesives that may be utilized to secure the flock fibers to the molded article include acrylics, urethanes, hot melt adhesives in general and the like. Likewise, the method for applying the adhesive may vary depending upon the type adhesive being used and the ultimate product desired. Spraying may be utilized to apply acrylic, urethane and the like type adhesive systems while hot melts may be advantageously applied by a roll system, especially where different color, length, etc. fibers are desired for upper and lower surfaces of the design side of the molded material. Utilizing a roll system, adhesive may be applied only to the upper surfaces of the design or to both the upper and lower surfaces. Likewise, other compounds such as release agents may be applied to control adhesion of the fibers to limited areas of the design. Hence, a release agent may be initially applied to the upper surfaces of the design after which the rolls can be preset to compress the foam and thus apply adhesive to the upper and lower surfaces of the design or the entire surface may be sprayed. Flock fibers thereafter applied will permanently adhere to the lower surfaces only and, after curing, the adhesive, release agent and fibers from the upper surfaces will be removed during cleaning. Upper surfaces of the design can then be left without fibers or decorated with fibers of different color or characteristics than thos applied to the lower surfaces. These adhesives may also be pigmented to blend with the color of the fiber or the like applied thereon.

A very interesting phenomena has been experienced with adhesive application and flocking. Subsequent to molding the foam material, the now three dimensionally defined surface may be almost completely flattened, the adhesive applied and the material flocked. Adhesive and flock fibers can thus be easily applied against a flat, practically non-design surface. After application of the flock fibers, heat applied to the composite will cause the return to the original molded contour. This technique fosters adhesive application as well as a uniform application of fibers. Control of the width and length of the molded material during adhesive and fiber application can also be utilized to control density of fiber application in certain cases.

Since the primary object of the present invention is to provide a three dimensional decorative article or material that emulates a design surface produced in the master mold, it is often desirable that the flock fibers do not assume a vertical disposition with respect to the base as is often preferred for flocking operations. Instead, the flock fibers may also be applied in a random, but uniform fashion after which they may, if desired, be forced by pressure into the adhesive. Suitable means for forcing the flock fibers into the adhesive system include rollers, pressure plates, and the like.

Subsequent to flocking and removal of excess fibers from the foam material, a pressure sensitive adhesive may be applied to the side opposite the flocked side for securing the material to some desired surface. A release paper may also be used on the back side to prevent adhesion of the material prematurely. Likewise, backing materials or the like may be applied to the product, if desired.

DESCRIPTION OF THE SPECIFIC EMBODIMENTS

Figure 1:
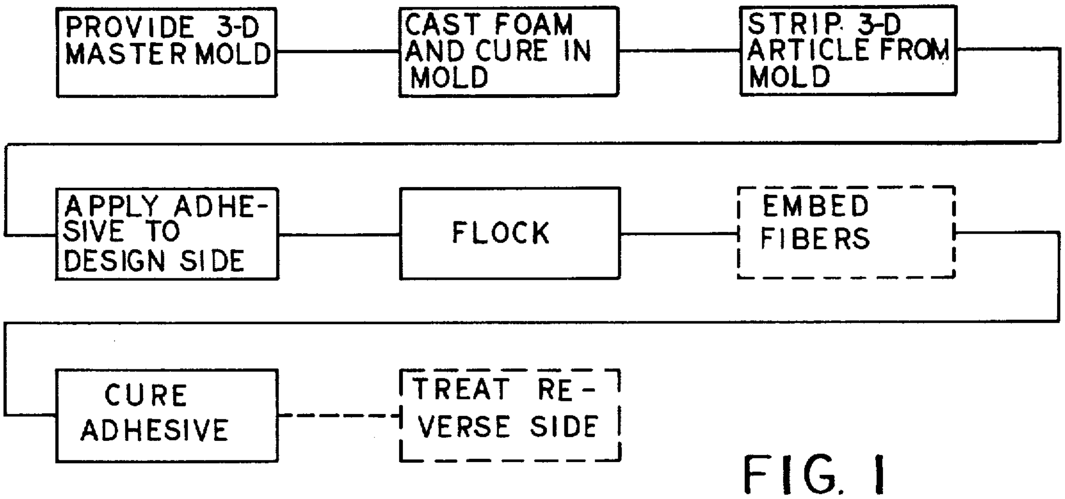
FIG. 1 is a block diagram depicting the general steps of the process according to the teachings of the present invention.

Referring to the Figures, specific embodiments of the present invention will now be described in detail. FIG. 1 outlines a general process according to the teachings of the present invention for producing a decorative, three dimensional article or material. Following the process line, a master mold is provided into which is cast a foam composition for producing a three dimensional replica of the design provided in the mold. Preferably, the master mold is in the form of a continuous belt which may be used for continuous or semi-continuous production of a strip of three dimensional replicas therefrom. A room temperature, vulcanizable, silicone material, hereinafter sometimes referred to as an RTV silicone material, is preferably utilized to produce the master mold, patterned from an object having a desired shape or design. A strip of adjacent replicas of the object may then be made into a continuous belt by cementing opposite ends thereof, preferably with a silicone elastomer, to provide a seamless connection. With the master mold produced and positioned around driving rollers, the mold can then be continuously operated. Depending upon the construction of the master mold, same may be supported by an endless belt or may serve as the belt itself.

A foamable composition is cast into the cavities of the master mold and leveled across the top thereof to achieve a predetermined and uniform thickness. Speed of travel of the master mold with the foam deposited therein is synchronized with time, a heat source or the like so as to set up, cure or fuse the foam in situ, whereby the foam material in the mold cavities assumes the characteristics of the mold design with extremely good definition. The cured three dimensional foam material may then be continuously stripped from the end of the moving master mold and transported through the process for further handling. While many different foam compositions may be utilized in practicing the present process, a frothed vinyl, SBR foam rubber, or polyurethane foam composition is preferred. Also, as discussed in detail hereinafter, a mold pretreatment may be desirable to further improve definition of the molded product.

Once the three dimensional foam material is produced, it may be further processed to decorate the design by flocking, or the like to aesthetically improve the ultimate product. An adhesive suitable for securing flock fibers to the foam is applied to the side of the material having the three dimensional design. Adhesive may be applied as desired under the particular surrounding circumstances so as to suitably secure the fibers to the foam and thus simulate a woven, nonwoven, knitted or tufted textile product, or to aesthetically add to the design reproduced in the foam. Different types of adhesive systems may be utilized in manufacturing the three dimensional decorative material according to the teachings of the present invention. In this regard, various adhesive systems such as water based acrylics, solvent or water based urethanes, or the like may be sprayed, cast, rolled or the like onto the three dimensional surface of the foam so as to insure complete coverage thereof including the full depths of the cavities or depressions in the design. Furthermore, it has been found quite advantageous to use a hot melt adhesive system that may be applied by a metered roll which preferably is part of a nip roll system or is backed up by a pressure plate or the like, onto predetermined surfaces only of the three dimensional foam material or onto all surfaces of the foam material design as desired. Pigments may also be incorporated into the adhesive system to blend with the color of the flock fibers or other decorative materials. Such pigmentation is sufficient to completely mask the foam substrate, such that the foam cannot be seen from the decorated side of the composite. This coloration of the adhesive eliminates the need for matching the foam color to the fiber color.

Subsequent to the application of adhesive, the material is passed through a flocking station where short fibers are deposited onto the design side, into contact with the adhesive layer. The particular flocking system is not a part of the present invention and any suitable system may be employed. Depending upon the particular end use of the product being produced or the effect desired, the flock fibers may be deposited in a completely random but uniform manner; to assume a vertical disposition; or otherwise. Since a primary object of the present invention is to produce replicas of woven, knitted, nonwoven or tufted products, the fibers are preferably embedded in the adhesive by suitable means to gain the appearance of the product being simulated.

Ultimate appearance, the adhesive system and/or fiber length may dictate a preferred flocking method for deposition of flock fibers onto a molded product according to the present invention. For example, duplication of a textile product may be best accomplished if the fibers appear to be a part of a fiber bundle. Hence both short and long fibers may be used depending upon the molded pattern. Likewise, mechanical and/or electrostatic flocking techniques may be employed. For carpet reproduction, very short fibers have been found to give extremely good tuft definition. Likewise, certain adhesives such as hot melt adhesives are best handled by random mechanical flocking followed by further possible treatment to embed the fibers into the adhesive layer.

A tufted or nonwoven carpet may thus be accurately duplicated by the present process. Flock fibers may be mechanically deposited in random fashion or very short fibers may be electrostatically applied onto the adhesive coated surface of the foam material. Thereafter, if desired, the flocked material may be treated to embed the fibers into the adhesive layer that follows the foamy contour of the product being simulated. Embedding of the fibers generally following the mechanical flocking technique may be accomplished by pressure rollers, pressure plates, molds, heater bars or the like.

After the flock fibers or the like are properly positioned on the adhesive layer, the composite may be further processed according to one of several routes. The adhesive may be cured, followed by removal of excess fibers; the excess fibers may be removed followed by curing of the adhesive; or if desirable, the flock fibers may be embedded in the adhesive followed by one of the above listed procedures.

The improved product of the present invention is complete after all desired flocking or the like is accomplished, the adhesive cured and any excess decorative materials removed. It may then be desirable to cut the material into desired lengths, sizes or the like, or to treat the reverse side thereof to render same suitable for affixation to a wall, floor, or other intended surface.

Several modifications to the general process scheme according to the teachings of the present invention have been found to afford versatility to both the process and products producable thereby. These modifications will be described in detail hereinafter, but in general relate to treatment to the foam material before, during or subsequent to application of adhesive and flock fibers thereto. For example, the foam material may be prestretched in a longitudinal and/or transverse direction and in such condition have the adhesive and flock fibers applied thereto. After being stretched, and flocked, tension on the foam is released and the foam returns to its original condition. In this manner, the density of flock fibers may be increased as well as controlled. Furthermore, as briefly mentioned above, depending upon the system for applying adhesive to the three dimensional foam material, decorative effects may be attained by controlling the area of application of the adhesive and by subsequent processing, whereby different colored flocked fibers, different length flock fibers or the like may be applied. Further, it has been found that the vinyl foam may be flattened, flocked and heated to regain the dimensional design therein.

Figure 2:
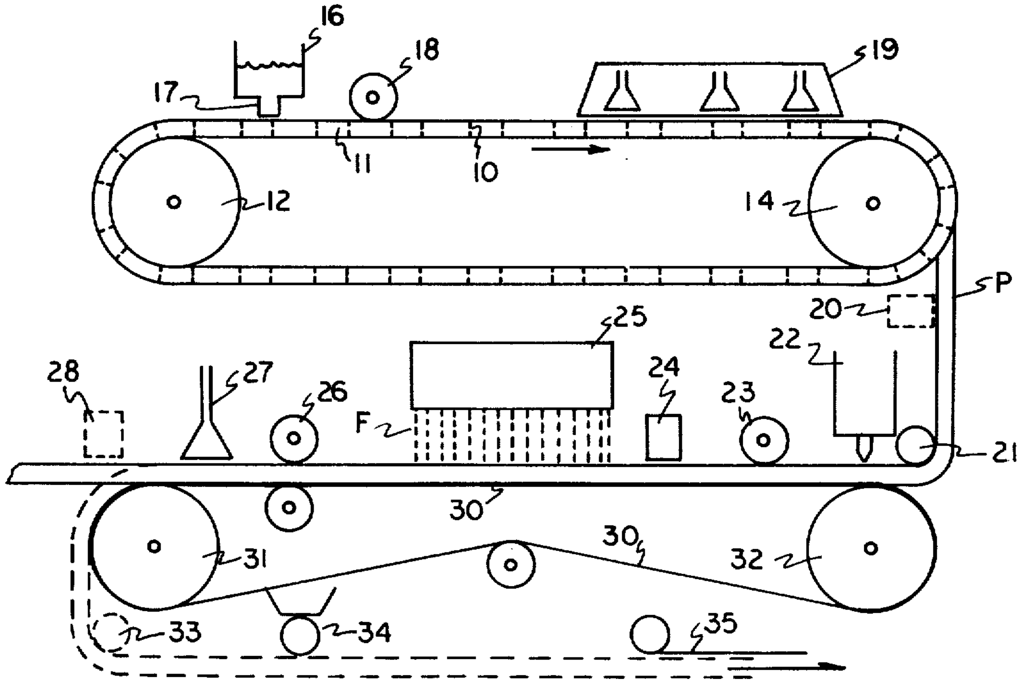
FIG. 2 is a line drawing of a process for producing a three dimensional decorative material according to the teachings of the present invention.

FIG. 2 pictorally illustrates a preferred embodiment of the general process of the present invention. A master mold 10 is provided as a continuous belt around driven rolls 12 and 14 so as to enable continuous or semi-continuous production of a material therefrom. As such, master mold 10 presents continuous repetitions of the design around the length thereof, cavities 11 of the design being indicated by broken lines around the periphery of the belt. A frothed foam composition or the like is applied into cavities 11 of mold 10 from a foam dispensing means 16. Foam dispensing means 16 preferably has a nozzle 17 that reciprocates across the width of belt mold 10 so as to evenly apply foamable material into cavities 11 of mold 10. As belt 10 moves in the direction of the arrow, an evening means 18 smooths the foamable composition across the top of cavities 11 so as to produce a foam product of even thickness. Thereafter, as belt mold 10 continues to move in the direction indicated by the arrow, the foamable composition begins to cure or fuse to assume the dimensional configuration of the mold cavities 11. A heat source 19 may be provided adjacent belt 10 so as to continuously fuse or cure the foamable composition in situ during movement of belt 10. Heat output from source 19 may be coordinated with the speed of belt 10 to insure complete fusion of the foam before the foam product is stripped from cavities 11.

As belt 10 moves around roll 14, the now molded three dimensional product P is stripped from mold 10 and is transported to a further section of the process for flocking or other decorating. If desired, the three dimensional side of product P may be further heated by a second heat source 20 (shown in phantom) so as to better prepare the design surface for receipt of adhesive. Product P then passes around a guide roll 21 and onto a belt conveyor 30. Product P is then transported by conveyor 30 under an adhesive application system 22. As will be discussed in further detail hereinafter, adhesive may be applied by either of several procedures. After application of adhesive, a further evening means 23 may be utilized if desired to insure even application of the adhesive across the desired surfaces of product P.

A width control means 24 may be positioned in line so as to enable stretching of product P in a transverse direction during application of adhesive thereto. Likewise, as product P resides on conveyor belt 30 that is supported by rollers 31 and 32, the speed of rolls 31 and 32 may be increased with respect to the incoming speed of product P so as to provide longitudinal stretching of product P during receipt of adhesive from system 22. Subsequent to the application of adhesive, product P passes adjacent a flocking station 25 where short fibers F are deposited onto the design side of product P. The particular mechanism for applying the flock fibers onto the product P can be any of the conventionally known flocking systems. Hence the fibers may be positioned by electrostatic, mechanical or other means, if desired, to be applied randomly in uniform fashion across the design side of product P, vertically disposed or the like. As mentioned above, to provide a replica of a woven, nonwoven, tufted, knitted fabric or the like, it may be desirable to embed the flock fibers in the adhesive layer. Embedding of the fibers F into the adhesive surface as opposed to providing vertically oriented fibers permits the fibers to appear as if they are a part of fiber bundles that are outlined in the molded product, though very short fibers may be vertically deposited (electrostatically) to emulate the textile product reproduced in the foam. Though numerous means may be employed for forcing fibers F down into the adhesive layer, a pair of nip rolls 26 are illustrated by way of example. Subsequent to nip rolls 26 is a vacuum means, or the like 27 which may be employed to remove loose fibers from product P. Likewise, a heat source 28 is shown in phantom. If necessary, heat source 28 which may be positioned on either side of vacuum means 27 may be utilized to cure the adhesive applied on product P.

Subsequent to the aforementioned steps, processing for the front or decorative face of product P is completed. To enable the utilization of the product, it is often desirable to treat the opposite or under side of the product so as to enable same to adhere to a further surface to provide a suitable backing, or the like. For example, it may be desirable to pass the product P around a further guide roll 33, under a second adhesive applicator 34 where a pressure sensitive adhesive or the like may be applied by means of spraying, kiss roll or the like for securing product P to said other surface. A release paper 35 may then be applied atop the pressure sensitive adhesive.

After final treatment of the product for decorative effects, the product may be further processed by cutting into desired length, shapes or the like so as to permit use thereof in varied environs.

Insofar as the master mold from which the three dimensional decorative products of the present invention are produced is concerned, several techniques may be utilized for manufacturing same. For example, it may be only necessary to apply a room temperature, vulcanizable silicone rubber over a model of the design to be duplicated. In some instances, however, where the particular product to be duplicated is not conducive to a direct replication, it may be necessary to first produce a plaster of paris cast of the article and then produce a silicone rubber plug mold (prototype) from the plaster cast followed by a recess silicone rubber mold.

Contigious mold sections may then be converted into a continuous belt to permit continuous or semi-continuous operation of the present process. Seamless construction may be employed during belt fabrication by using a silicone cement. Silicone is preferred as a material from which the master mold may be constructed due to its inherent mold release and high temperature characteristics. Any other material may be employed, however, that inherently possesses or is afforded good mold release qualities, such as vinyls, urethanes or the like. These materials do, however, generally require a release agent. A room temperature, vulcanizable silicone rubber has produced quite intricate molds from such items as a simulated brick wall, several carpet samples, a room divider with a hieroglyphic design thereon, a room divider with a random modern design thereon, panelling with a wood grain design, and the like.

Further, concerning the master mold, where an intricate design is presented on the lower surface of the mold cavities, it may be necessary to take positive steps to avoid entrappment of air under the foam which will appear at the upper design surfaces of the molded foam material. These bubbles generally burst and destroy the proper definition of the surface characteristics of the cavities. Several techniques may be employed to overcome bubbles on the design surface. A plurality of small openings may be provided through the bottom of the mold. Such vent openings may be produced by drilling the master mold, by the placement of pins on the article being duplicated whereby the mold was produced with the holes therein, and the like. A further technique which has proved quite successful involves precoating of the mold cavities with the foamable material prior to the normal casting of the frothed foam therein. The foam precoat of same composition as the frothed foam ensures complete coverage of the intracacies of the cavity surfaces and holds air bubbles below the surface of the foam where the bubbles are hidden and no adverse effects are realized therefrom.

Figure 3:
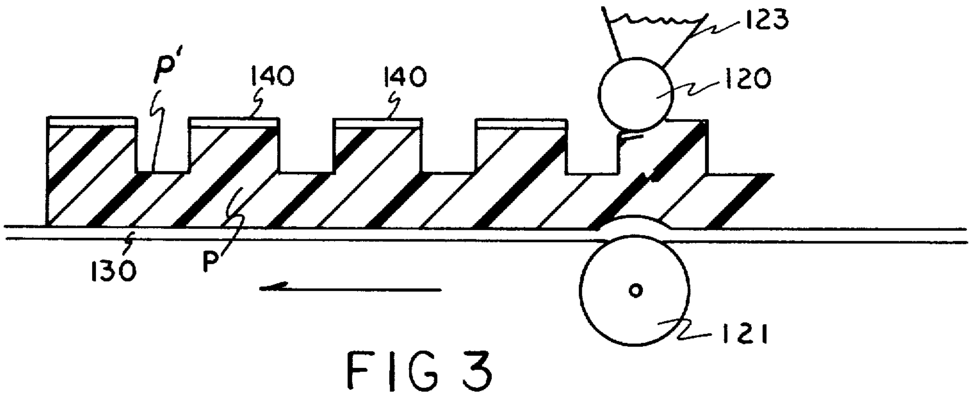
FIG. 3 is a partial side elevational view of a portion of the process of the present invention, showing one means of applying an adhesive to the three dimensional foam material.
Figure 4:
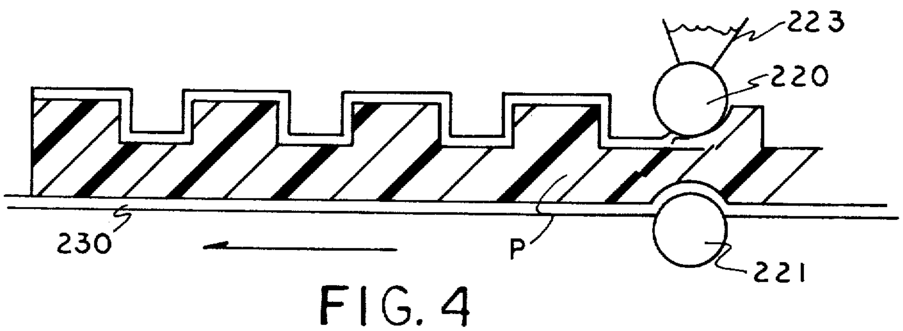
FIG. 4 is a partial side elevational view of a portion of the process of the present invention showing a further arrangement for the application of adhesive to the three dimensional foam material.

Referring to FIGS. 3 and 4, a more complete description will be set forth as to a means for applying adhesive to the three dimensional side of the foam material. In FIG. 3, there is shown a segment of a process where the three dimensional foam product P is moving on a belt 130 in the direction of the arrow. A pair of nip rollers 120 and 121 are positioned on opposite sides of the belt 130 and product P with roller 120 having adhesive source 123 associated therewith. Adhesive source 123 is illustrated schematically and may comprise any type system that will supply adhesive to roller 120 for application onto the desired surface of product P. In this particular arrangement, the nip rolls 120 and 121 are set sufficiently apart that only minor compression of the product P is experienced whereby an adhesive layer 140 is applied only to the upper surfaces of the three dimensional side of product P. Flock fibers subsequently deposited onto product P will adhere only to the adhesive layers and will not become secured within the cavities P' that further define the three dimensional section of product P. This arrangement thus provides a process for upper surface decoration only of the three dimensional product.

FIG. 4 shows yet another embodiment of the application of adhesive where the product P resides on a moving belt 230 and is passed between rollers 220 and 221 with an adhesive supply system 223 provided in conjunction therewith. In FIG. 4, rolls 220 and 221 are set much closer than is shown in FIG. 3 whereby during passage of the three dimensional foam product P therebetween, the product P is substantially compressed, permitting adhesive to be applied to both the upper and lower surfaces of the three dimensional design. Thereafter, flock fibers deposited onto product P will become embedded in the adhesive in both the upper and lower surfaces to become secured thereat.

Figure 5:
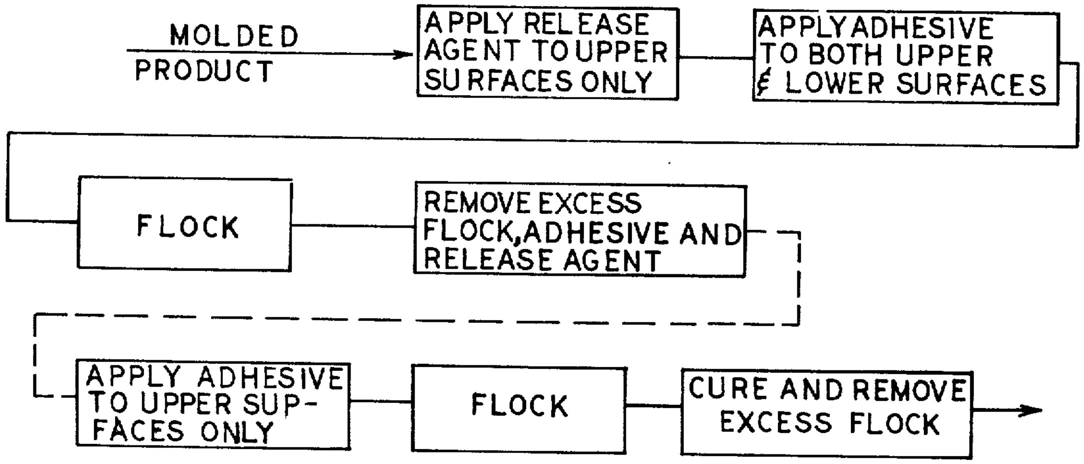
FIG. 5 is a block diagram of a segment of the process of the present invention illustrating further embodiments of the present invention.

A further modification utilizes a combination of the arrangements shown in FIGS. 3 and 4. This arrangement permits selective adhesion of fibers to particular surfaces only and is depicted in block diagram in FIG. 5. Starting at the point where a three dimensional molded product is available, a heat volatile release agent, many of which are well known in the art, may be applied to the upper surfaces of the design only. The adhesive nip roll arrangement of FIG. 3 may be employed for application of the release agent. Nip rolls arranged as shown in FIG. 4 may then be employed downstream to apply an adhesive to both upper and lower surfaces of the design, or both surfaces may be sprayed, or the like. The product may then be flocked where the flock fibers will become permanently secured only on the lower surfaces of the design. After flocking, the adhesive is cured and the excess fibers are removed from the lower surfaces while fibers and adhesive will be removed from the upper surfaces.

The product may then have been completely decorated with the upper surfaces of the design remaining unflocked. Alternatively, the product may be further treated to apply adhesive only to the upper surfaces of the design after first volatizing the release agent, followed by flocking with fibers of different length, color, etc. The second flocking operation will adhere the fibers to the upper surfaces only, thus providing a means to flock a single design with different fibers.

Figure 6:
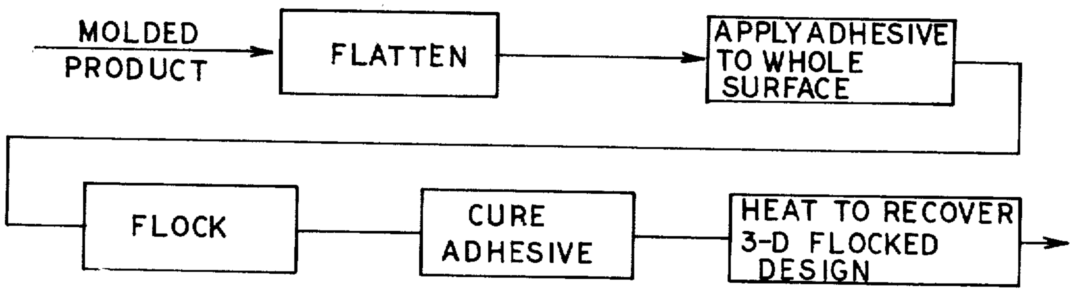
FIG. 6 is a block diagram of a segment of the process of the present invention illustrating yet another embodiment of same.

Still another modification to adhesive application and flocking is shown by way of block diagram in FIG. 6. The molded product may be passed through nip roll or equivalent means after molding and while still warm to flatten the dimensional design. Thereafter, adhesive could be conveniently applied across the complete, flattened upper surface of the molded product and flocked. Once the adhesive was cured, the flattened flocked product can then be heated, whereby the three dimensional design returned to its original state. Flattening prior to application of adhesive enables an easier application and more uniform layer of adhesive to be deposited onto the molded foam product. Alternatively, the molded material may be heated while being flattened.

The present invention may be more fully understood by reference to the following examples.

EXAMPLE 1

A section of wood panelling having a wood grain textured surface was selected as an object to be reproduced. The panelling was placed within a retainer wall and was sprayed with Pattern Release 202, an aerosol containing a refined petroleum jelly, methylene chloride and a fluorinated hydrocarbon propellant, manufactured by National Engineering Products Incorporated, Washington, D.C. An RTV silicone mold composition was then poured over the panelling within the retainer wall, leveled across the top of the retainer wall and allowed to stand for 12 hours. The RTV silicone composition comprised 100 parts Silastic G, an elastomeric polysiloxane resin, manufactured by Dow Corning Corporation, Midland, Mich.; 10 parts of a catalyst supplied by Dow Corning Corporation for Silastic G, (unidentified by Dow Corning) and 10 parts of a thinner, a 100 per cent dimethyl polysiloxane at 20 centistokes viscosity, were mixed thoroughly and deaired by means of a vacuum chamber. Thereafter, the polymerized silicone was demolded from the panelling. An engraved silicone mold with extremely good definition of the textured surface of the panelling resulted. Several repeats of the above procedure produced mold sections for the assembly of a mold belt. The sections were butt joined with Silastic 732, a polysiloxane adhesive manufactured by Dow Corning, to produce a repetitive pattern in a continuous belt of a desired length. The Silastic 732 adhesive produces a virtually seamless connection. Each of the belt sections produced with the panel design therein exhibited excellent definition in the mold cavities.

EXAMPLE 2

The procedure of Example 1 was followed with the exception that a three dimensional brick type pattern was employed in lieu of the wood panelling. The pattern was produced by ½ inch wooden blocks, 2½ inches × 8 inches and 2½ inches × 4 inches with rounded corners mounted on a ¾ inch plywood base to simulate a brick pattern. Silicone molds having perfect definition of the brick pattern were produced.

EXAMPLE 3

A corrugated paper panel was substituted for the wood panelling of Example 1. Good silicone molds duplicating the corrugations were produced.

EXAMPLE 4

Two room dividers having textured surface designs thereon were employed as the objects of Example 4, following molding procedures of Example 1. One of the dividers had a modern design and the other a design patterned after Aztec Indian hieroglyphics. Silicone molds showing excellent design definition were produced.

EXAMPLE 5

A section of tufted rayon carpet was placed within the confines of a retainer wall. Plaster of paris was then poured directly onto the carpet and allowed to harden. Thereafter, the plaster of paris and carpet were removed from within the retainer wall and the carpet was burned out of the hardened plaster cast with hydrocholoric acid, leaving the exact detailed reverse reproduction of the contour of the tufted carpet in the plaster cast. This reverse was then placed within retainer walls and a silicone rubber composition as described in Example 1 poured thereover to produce a silicone rubber prototype with the tufts pointing upwardly. The silicone prototype was then placed within the confines of the retainer wall and a further mixture of the silicone rubber of Example 1 was poured thereover and permitted to sit for 12 hours. The polymerized silicone master mold that was produced exhibited extremely good tuft definition of the original carpet sample.

EXAMPLE 6

A 60 foot continuous belt mold, 34 inches wide was produced from 9 foot sections of silicone molds having six different designs therein. Each 9 foot section of the belt mold was cemented to adjacent sections with Silastic 732 adhesive, a room temperature, vulcanizable elastomeric silicone adhesive composition manufactured by Dow Corning. Each section represented one of the following designs: tufted carpet, brick, Aztec hieroglyphics, modern (appearance of frosted or broken glass), corrugated paper, and sun discs (major circles with plurality of concentric arcuate lines within the circles). The above belt mold was secured to a driven fiberglass continuous belt and was operated to continuously produce a three dimensional foam material. Vinyl foam having a composition of 60 parts vinyl resin No. 0565, a polyvinyl chloride dispersion resin produced by Tenneco Chemicals, Inc., Plastics Division, Piscataway, N.J.; 40 parts vinyl resin No. 521, a polyvinyl chloride general purpose resin produced by Tenneco; 15 parts calcium carbonate; 88 parts Kodaflex CB-A, a vinyl plasticizer supplied by Eastman Chemical Company, Kingsport, Tenn.; 2 parts Ferro Stabilizer No. 5919, a barium, cadmium, zinc heat stabilizer for vinyl chloride, supplied by Ferro Corporation, Bedford, Ohio and 4 parts Silicone Surfactant No. DC-1250, a surface control agent supplied by Dow Corning Corporation, Midland, Mich.

The above materials were blended and placed into an Oakes foamer, a device to meter air into the foam to control the density thereof, manufactured by E. T. Oakes Corporation, Islip, Long Island, N.Y. The Oakes foamer was operated at a line pressure of 70 PSI; foam air pressure of 38 PSI; a pump setting of 25 and a rotary setting of 375. Vinyl foam having a cup density of 321 grams per liter was produced. From the Oakes foamer, the vinyl foam composition was continuously cast into the cavities of the 60 foot belt mold moving at a linear speed of 2 feet per minute. The foam was fused approximately 15 minutes in an oven at a temperature of approximately 160°C. Samples of the carpet and Aztec patterned foam material that were stripped from the mold exhibited air bubbles adjacent the upper design surfaces thereof which detracted from the surface definition. Patterns having less intricacy at the upper surfaces were unaffected by the entrapped air bubbles.

EXAMPLE 7

Example 6 was repeated on a 10 inch × 45 inch section of the carpet pattern of the belt with the exception that prior to casting the vinyl foam, a heavy pressure roll was utilized to precoat the mold cavities with the vinyl foam composition. After curing of the foam in situ, no entrapped bubbles appeared on the surfaces of any of the patterns.

EXAMPLE 8

Utilizing a carpet master mold produced according to Example 5, the following frothed foam rubber composition was poured thereover; 100 parts SBR rubber, styrene butadiene rubber supplied by Colox Corporation, Dalton, Ga.; 15 parts No. 808, a quartinary ammonium salt sensitiver produced by Colox Corporation; 2 parts D439-5, a vinyl dispersion of zinc oxide in combination with zinc dithiocarbamate, supplied by Colox Corporation; and 8 parts D-917-2, an ammonium acetate gel supplied by Colox Corporation.

The first three ingredients of the above list were mixed in a Hobart mixer at No. 2 speed for 90 seconds, after which the D-917-2 gel was added followed by mixing for an additional 20 seconds. The mixing was then stopped and the speed switched to No. 3 setting for 15 seconds to break up large air bubbles. The mixture was then removed and poured over the master mold where the thickness was controlled by a doctor blade. The foam was then cured with heat at 325°F. for 12 minutes after which the three dimensional foam product was removed from the silicone belt. The molded product exhibited very good definition of the tufts and the fiber bundles of the carpet, and was considered to be a very acceptable three dimensional foam reproduction of the carpet.

EXAMPLE 9

Example 8 was repeated with the exception that a vinyl foam was utilized, the formulation of which is as follows: 60 parts vinyl resin No. 0565, polyvinyl chloride dispersion resin produced by Tenneco Chemicals, Inc., Plastics Division, Piscataway, N.J.; 40 parts vinyl resin No. 521, a polyvinyl chloride general purpose resin produced by Tenneco; 25 parts calcium carbonate; 90 parts Kodaflex CB-A, a plasticizer composition supplied by Eastman Chemical Company, Kingsport, Tenn.; 2 parts Ferro stabilizer No. 5919, a heat stabilizer polyvinyl chloride supplied by Ferro Corporation, Bedford, Ohio, and 4 parts Silicone Surfactant No. DC-1250, a surface control agent supplied by Dow Corning Corporation, Midland, Mich.

The vinyl resins and calcium carbonate were added to a Hobart mixer at No. 1 low speed after which the Ferro stabilizer No. 5919 was added. One half of the Kodaflex plasticizer was then added over a 2 to 3 minute period after which mixing continued for 5 minutes to complete the kneading process and smooth out the composition. The silicone surfactant was then added and the mixing continued for approximately three to four minutes. A wire type paddle was then used on the mixer and a No. 2 speed setting and mixing continued for 5 minutes at which time cup density was 121 grams or 632 grams per liter. The frothed foam was then applied over the silicone belt as described above and cured for 7 minutes at a temperature in the range of 280° to 290°F. A three dimensional vinyl foam product was produced having excellent definition of the carpet model.

EXAMPLE 10

The molded carpet products from Examples 8 and 9 were divided into two groups each for coating and flocking. Group 1 products were coated with a water based acrylic adhesive, Techbond AA-635A manufactured by Raffi and Swanson, Wilmington, Massachusetts, after which short rayon fibers were evenly distributed over the surface of the samples. The water based adhesives on the Group 1 samples were cured by drying at 260°F. for 10 minutes in a circulating air oven to securely unite the embedded fibers to the surface. A very good simulated tufted carpet resulted in each sample.

The Group 2 samples were treated with a hot melt adhesive comprising 20 parts Elvax 40, an ethylene vinyl acetate copolymer manufactured by E. I. Dupont de Numeours Company, Wilmington, Del.; 40 parts Stabellite, a mixture of reactive olefins manufactured by Hercules Incorporated, Wilmington, Del. and 40 parts Eastobond M5L, an amorphous polypropylene manufactured by Eastman Chemical Products. The adhesive composition was applied to upper and lower surfaces of the carpet design according to the procedure shown in FIG. 4 of the drawings followed by flocking. The flocked composite was then passed under a pressure roll to embed the fibers into the adhesive. A good, simulated tufted carpet resulted in each case.

EXAMPLE 11

A sample of molded foam as produced in Examples 1 through 4 were stretched in the longitudinal direction after which the hot melt adhesive of Example 10 was applied thereto. Flock fibers were then deposited onto the stretched foam and the tension maintained until after flocking. Tension was then released and the foam returned to its normal dimensions. A high density flocked product resulted.

EXAMPLE 12

A 6 inch× [inch sample of molded vinyl foam carpet produced in Example 7 was warmed and passed through a tight nip roll. The foam exited a nip roll in a nearly flat state with very poor carpet definition. The flattened sample was cut across its length in a zig zag fashion. An acrylic adhesive, Techbond AA-635A, produced by Raffi and Swanson, Wilmington, Massachusetts was rolled onto both samples andd both samples were electrostatically flocked with very short rayon fibers approximately 0.025 inch in length. One of the sample halves was then heated for 9 minutes at a temperature of approximately 260°F. while the other sample was used as s control. The heated sample regained good carpet definition with the flocked fibers appearing as yarn bundles, while the unheated sample half remained flat.

EXAMPLE 13

A group of rayon fibers were divided into groups. One group was dyed red with a direct dyestuff composition, comprising Procion Scarlet H2G dyestuff, manufactured by ICI Industries, London, England, and the other group blue with a direct dyestuff composition comprising Atlantic Blue RULM dyestuff manufactured by Atlantic Dyestuff Company, Nutley, N.J. The same colors were added to Techbond AA-635A acrylic adhesive, manufactured by Raffi and Swanson, Wilmington, Massachusetts. Red pigment used was Sherdye Scarlet DL3W, blue pigment was Sherdye Blue G3W, both of which were manufactured by Sherwin-Williams Company. The colored adhesive compositions were rolled onto a brown vinyl carpet foam followed by flocking with the matching color rayon fibers and curing. Visual observation of the flocked carpet sample indicated that the pigmented adhesive completely covered the brown vinyl, thus indicating that for color effect, the vinyl or the adhesive may be pigmented to match the color of fiber or other decoration.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. A three dimensional stock material comprising:

a. an organic polymeric foam base, said base having been foamed in situ over a pattern having a three dimensional surface, whereby said base has an exposed in situ molded three dimensional surface design conforming to said pattern surface;

b. an organic polymeric adhesive layer on said exposed three dimensional surface design; and c. short synthetic polymeric textile fibers secured in said adhesive layer, said fibers being positioned in said layer to simulate the surface characteristics of said pattern.

2. A three dimensional stock material as defined in claim 1 wherein the three dimensional surface design is an exact replica of a textile fabric surface.

3. A three dimensional material as defined in claim 1 wherein the organic polymeric foam base was produced from a member selected from the group consisting of foamed polyvinyl chloride plastisols, foamed rubber latices and foamable polyurethane reaction mixtures.

4. A three dimensional material as defined in claim 1 wherein the organic polymeric adhesive layer is provided by an adhesive selected from the group consisting of acrylic adhesives, urethane adhesives, and hot melt adhesives.

5. A three dimensional material as defined in claim 2 wherein the textile fabric surface is a tufted carpet surface.

6. A three dimensional material as defined in claim 1 wherein different fibers are applied to different portions of the three dimensional design.

* * * * *